April 22, 1969 S. HOWARD 3,439,922

CLEANER CARTRIDGE

Filed Dec. 19, 1967

INVENTOR.
SHELDON HOWARD

BY Allan M. Shapiro

ATTORNEY

United States Patent Office 3,439,922

Patented Apr. 22, 1969

3,439,922

CLEANER CARTRIDGE

Sheldon Howard, Los Angeles, Calif.
(13341 Bracken St., Arleta, Calif. 91331)

Filed Dec. 19, 1967, Ser. No. 691,881
Int. Cl. G11b *3/58*
U.S. Cl. 274—47 8 Claims

ABSTRACT OF THE DISCLOSURE

A device for cleaning the playback head and other components of a cartridge-type magnetic tape player. A cassette dimensionally conforming to a cartridge is accepted by the player, containing a loop of abrasive coated tape. When the cassette is inserted in the player, the abrasive coating cleans the playback head as the loop is driven past the head by the player capstan. Brake means in the cassette permits the tape to be stopped, enabling the abrasive coating to clean the still rotating capstan. For players in which the idler wheel is self-contained, the cleaner cartridge also includes an idler wheel cleaning brush.

BACKGROUND OF THE INVENTION

*Field of the invention*

The present invention relates to a cartridge for cleaning tape player components and, more particularly, to a cartridge cleaner, insertable in a tape player, and containing a loop of abrasive coated tape.

*Description of the prior art*

In recent years, the use of cartridge-tape magnetic tape players has become extremely widespread. The fact that pre-recorded tape cartridges are available with a wide variety of recorded information, and that these tape cartridges can be played without the usual inconvenience of threading a tape through a series of idler wheels and capstans, has added to this popularity. Further, such cartridge players lend themselves readily to use in an automobile and have become increasingly accepted in this application.

A common problem which develops in cartridge-type tape playback devices is that dust and dirt accumulate on the tape playback head, the drive capstan, and (in those playback units containing them) the idler wheel. Accumulation of dirt on the playback head may give rise to noise or distortion as the tape is played back. Moreover, dirt on the capstan may result in slippage of the tape, causing it to be driven past the playback head at other than a constant rate, This too, causes distortion of the sound being reproduced.

In the past, cleaning of the tape playback head, drive capstan and idler wheel required a maintenance person to wipe or abrade each component using, for example, a cotton swab dipped in a solvent, or a finely abrasive tool. This cleaning often necessitated removal of the player from its housing, a particularly difficult problem when the tape player was mounted in or beneath an automobile dashboard.

The present invention overcomes the difficulties of cleaning tape player components by providing a cleaner cartridge conforming in size and shape to the normal tape cartridge accepted by the player. The cleaner cartridge, when inserted, cleans both the tape head and the drive capstan, as well as the idler wheel in players wherein the idler wheel is self-contained.

SUMMARY OF THE INVENTION

In accordance with the present invention, there is provided a cartridge for cleaning tape player components. The cleaner cartridge comprises a case or cassette, preferably of plastic, dimensionally conforming to a tape cartridge utilized by the player. Within the case is contained a continuous, single loop of tape having an abrasive coating. The tape is situated so that, when the cassette is inserted in the tape player, the abrasive coated tape will clean the playback head as the loop is driven past the head by the tape player capstan.

Brake means, consisting of a stationary member extending substantially between the top to the bottom of the cassette, and a longitudinally movable, rod-shaped button or member extending through an edge of the case, is provide to inhibit motion of the tape loop. By pressing the button, the tape loop is gripped between the button and the stationary member so as to stop tape movement. The capstan is cleaned by the tape abrasive coating as the capstan rotates in contact with the stopped tape loop.

For tape players having a self-contained idler wheel, the cartridge clearner is provided with a brush situated to clean the periphery of the idler wheel when the idler is engaged with the inserted cartridge. The brush comprises a felt pad on a spring metal holder; the pad may be impregnated with acetone or a similar solvent to aid cleaning of a rubber or plastic idler wheel.

Thus, it is an object of the present invention to provide a cleaner cartridge for cleaning tape player components.

It is another object of the present invention to provide a cleaner cartridge insertable in a tape player and containing a loop of abrasive coated tape.

It is a further object of the present invention to provide a cartridge for cleaning the playback head and drive capstan of a tape player, the cartridge containing a continuous abrasive coated loop, and means for inhibiting motion of the tape loop.

A further object of the present invention is to provide an insertable cleaner cartridge for tape players, including brush means for cleaning the tape player idler wheel.

Still a further object of the present invention is to provide a tape player cleaning cartridge having an abrasive coated magnetic tape lop, including a tone pattern prerecorded on the loop.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

DESCRIPTION OF THE PREFERRED EMBODIMENTS

Figures 1, 2, 3, 4, 5, 6, 7:
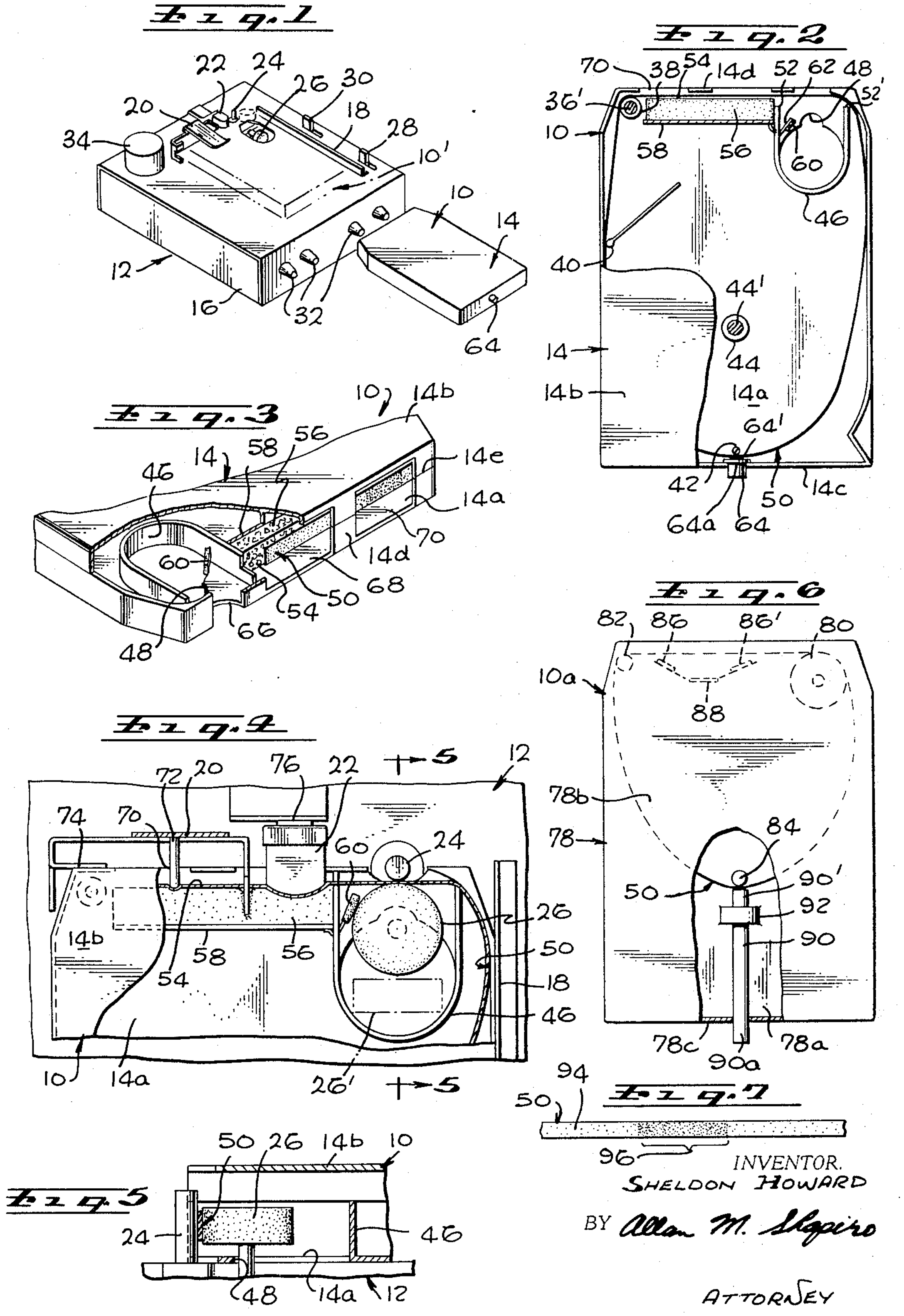
FIGURE 1 is a reduced size perspective view of the inventive cleaner cartridge for tape player components, as shown in an exploded manner with a typical cartridge-type magnetic tape player which may be cleaned using the present invention.
FIGURE 2 is a top plan view, partly broken away, of one embodiment of the inventive cleaner cartridge having particular usefulness with tape players having a self-contained idler wheel.
FIGURE 3 is a fragmentary perspective view, partly broken away, of one end of the cleaner cartridge illustrated in FIGURE 2.
FIGURE 4 is a fragmentary top plan view, partly broken away, illustrating the cartridge of FIGURE 2, inserted within a tape player such as that illustrated in FIGURE 1.
FIGURE 5 is a fragmentary elevation view, partly in section, of a tape player idler wheel and drive capstan, and of the inventive cartridge cleaner, as seen generally along line 5—5 of FIGURE 4.
FIGURE 6 is a top plan view, partly broken away, of another embodiment of the inventive cleaner cartridge for tape player components of the type wherein the idler wheel is contained within the cassette.
FIGURE 7 is a fragmentary elevation view of an abrasive coated tape which may be utilized in conjunction with the inventive cleaner cartridge.

Referring to the drawings, and particularly to FIGURE 1 initially, there is shown an inventive cleaner cartridge indicated generally at 10, for cleaning components of a tape player such as the playback apparatus indicated generally at 12. Cleaner cartridge 10 includes case 14, preferably of plastic, which conforms dimensionally with the tape cartridge normally played by playback apparatus 12. Cartridge 10 is adapted for insertion into playback apparatus 12, and when in use, is received in position 10' shown in phantom.

In the typical version illustrated in FIGURE 1, tape playback apparatus 12 includes chassis 16 having appropriate guide members 18 for receiving a pre-recorded magnetic tape cartridge. When inserted, the cartridge is held in place by spring clip 20. Tape contained within the cartridge is driven past tape playback head 22 by means of drive capstan 24. In the embodiment shown, idler wheel 26, which holds the tape against drive capstan 24 for driving movement of the tape, is contained within tape playback apparatus 12, normally in the recessed position illustrated. After a cartridge has been inserted, lever 28 is used to rotate idler wheel 26 into its operational position.

Tape playback apparatus 12 also is provided with lever 30 to raise and lower the position of tape playback head 22 whereby selection is obtained of the tracks to be played back in a four or eight track tape system. Apparatus 12 also is provided with knobs 32 to control volume, tone, stereo balance, etc. Also evident in FIGURE 1, is housing 34 which contains the drive motor to power capstan 24.

Referring particularly to FIGURE 2, cartridge 10 is seen to comprise case or cassette 14 having bottom wall **14*a*, top wall 14*b*, rear edge wall 14*c* and forward edge wall 14*d*. Preferably, case 14 corresponds in shape and dimensions to a standard tape cartridge case and includes a number of structural portions which are integral with the bottom wall 14*a* and extend substantially from the bottom 14*a* to the top 14*b* of case 14. These vertically transverse portions include tape guide members 38, 40 and 42, as well as spindle 44 which, in a standard tape magazine, may comprise the spindle for holding a reel of tape. Also contained within case 14 is substantially U-shaped guard member 46 which surrounds opening 48 in the bottom 14*a*, through which an idler wheel (such as idler wheel 26 of tape playback apparatus 12) may be inserted. The top wall 14*b* is provided with projections which extend downwardly for mating or fastening engagement with other portions of the case 14, such as rods 36' and 44' extending into guide member 38 and spindle 44**, respectively.

Disposed within case 14 of inventive cleaner cartridge 10, is a single, continuous loop 50 of tape having a width which may be greater than that of the magnetic tape normally played by the player being cleaned but preferably is of the same width for economical availability. The outside surface of tape loop 50 is coated with a fine abrasive material held to the tape by an appropriate binder. Tape 50 may or may not be magnetic coated, as discussed more fully hereinbelow. As may be seen in FIGURE 2, tape 50 is disposed in a path defined by the terminal edges 52 and 52' of U-shaped member 46 and guide members 38, 40 and 42. Tape 50 further is guided along face 54 of sponge compression member 56, which sponge member itself is attached to transverse planar member 58 which is integral with and extends upwardly from bottom **14*a***.

In the embodiment shown in FIGURES 1–5, inventive cleaner cartridge 10 is adapted for use with a tape player having its own idler wheel 26. To clean the idler wheel, cartridge 10 further is provided with brush 60 which may comprise, for example, a small felt pad attached to one leg of U-shaped member 46 by means of spring metal 62 (see FIGURE 2). Brush 60 is adapted to engage the periphery of idler wheel 26 when inserted through opening 48 (see FIGURE 4).

As seen in FIGURE 2, a button 64, comprising a substantially rod-shaped member extending loosely through edge wall **14*c* of case 14, includes flange portion 64*a* which prevents button 64 from falling out of case 14 and provides a head end 64' positioned opposite tape guide member 42, with tape loop 50 therebetween. Thus, when button 64 is manually depressed inwardly of case 14, the head end 64' of button 64 will press tape 50 against member 42, thereby inhibiting motion of tape 50 by frictionally slowing or even stopping tape 50** in its movement as will be described more fully later.

Various additional features of cleaner cartridge 10 are shown in the perspective view of FIGURE 3, which illustrates more clearly U-shaped member 46 for preventing the tape 50 within case 14 from becoming entangled in an idler wheel inserted through opening 48. Bottom **14*a* of case 14 includes notch 66, within which the drive capstan 24 of tape player 12 (see FIGURE 1) is received. As seen in FIGURE 3, case 14 is assembled from two halves mating along junction line 14*e* and recessed therealong for commonly providing openings 68 and 70 in end 14*d* of cartridge 10. It is through opening 68 that the tape playback head (such as head 22 shown in FIGURE 1) extends to engage tape 50 within case 14. Opening 70 receives the tape player member 72 (FIGURE 4) used to maintain a magnetic tape taut as the tape is driven toward the playback head. Alternatively, since cleaner cartridge 10 may be used equally well with either a tape recorder or a tape player, opening 70 may receive the erase head while opening 68** receives the record/playback head of a cartridge apparatus adapted for tape recording. Note that when the inventive cleaner cartridge is used with such an apparatus, it will clean both the erase head and the record/playback head.

Referring more particularly to FIGURE 4, inventive tape cartridge 10 is shown engaged in operative cleaning position 10' within typical tape playback apparatus 12 (see FIGURE 1). As seen in FIGURE 4, idler wheel 26 has been rotated from recessed position 26' shown in phantom lines into the operational position wherein it presses abrasive coated tape 50 against drive capstan 24. Rotation of capstan 24 drives tape 50 past tape playback head 22 while compression member 56 insures continuous contact between tape 50 and head 22. Member 72, which extends through window 70 in case 14, holds tape loop 50 against sponge compression member 56 and insures that tape 50 is taut as the tape is pulled past head 22. Tab 74 prevents cleaner cartridge 10 from being inserted so far into tape player 12 that head 22 or member 72 excessively compresses sponge 56.

The abrasive coating on the face of tape 50 cleans head 22 during its passage therealong. It may be desirable, as tape 50 is being driven past head 22, to raise and lower the position thereof to insure that all portions of the playback head are clean. This is accomplished by operating lever 30 (see FIGURE 1) so as to raise and lower head 22 via support member 76 in the same manner as normally used for selecting playback tracks.

Also evident in FIGURE 4, is brush 60, shown in position for cleaning idler wheel 26. As drive capstan 24 rotates, idler wheel 26 also rotates due to motion imparted via tape 50. During this rotation, the periphery of idler wheel 26 is cleaned by brush 60. As noted hereinabove, brush 60 may be impregnated with a few drops of a solvent such as acetone to help dissolve dirt on idler wheel 26.

Referring more particularly to FIGURE 5, note that normally, as capstan 24 rotates, tape 50 moves past capstan 24 at the same rate as the periphery of capstan 24. Since there is no relative motion between tape 50 and the periphery of capstan 24, there is essentially no abrasive cleaning action of capstan 24 by moving tape 50. Thus, to clean capstan 24, it is necessary to slow down or stop tape 50, while still maintaining capstan 24 in its normal rotating condition. This is effectuated by depressing button 64 shown in FIGURE 2. When so depressed, button 42 engages tape 50 against transverse member 42, inhibiting motion of tape loop 50. Thus, if button 64 is depressed while inventive cleaner cartridge 10 is engaged as shown in FIGURE 5, the periphery of capstan 24 will be cleaned due to its motion relative to the abrasive tape 50.

The preceding description primarily has been concerned with an embodiment of the invention to be used in conjunction with tape players having a self-contained idler wheel. Of course, the invention is not so limited. The embodiment of the inventive cleaner cartridge illustrated in FIGURE 6 is useful for cleaning components of a tape player of the variety utilizing cartridges which themselves include an idler wheel.

Referring now to FIGURE 6, cleaner cartridge **10*a* includes case 78 having bottom 78*a* and top 78*b*. Enclosed within case 78 is abrasive coated tape loop 50*a*, which is guided around self-contained idler wheel 80, guide post 82, and transverse guide member 84. Guide member 84 extends substantially from bottom 78*a* to top 78*b*, and may comprise the spindle for a reel of tape normally contained within a standard tape cartridge. Note that brushes 86 and 86′, supported by member 88, replace and serve the same function as compression member 56 in cleaner cartridge 10** shown in FIGURE 2.

In cleaner cartridge **10*a*, the brake means for inhibiting motion of tape loop 50*a* comprises transverse member 84 and rod 90, which rod is parallel to bottom 78*a* and top 78*b* and projects through rear end or edge 78*c* of case 78. A transverse apertured support 92 slidably receives rod 90 therethrough for maintaining alignment of rod head 90′ with member 84. Projecting end 90*a* of rod 90 functions as a button which, when manually depressed, causes tape 50*a* to be engaged between rod head 90′ and transverse member 84, inhibiting the motion of tape 50*a***.

As seen in FIGURE 7, tape loop 50 is provided with an abrasive coating 94. Typically, coating 94 may comprise extremely fine particles of Carborundum bonded to plastic-based tape 50 by means of a binder such as an epoxy. Of course, abrasive 94 is disposed on the outside surface of loop 50 so as to engage the face of the tape head being cleaned. In the preferred embodiment illustrated, a section 96 of tape 50 is coated with a standard magnetic oxide and contains a pre-recorded tonal pattern such as "beeps" which, when played back by tape player 12, indicates audibly to the user that tape 50 indeed is in motion and is cleaning head 22. Thus, repetitive rendition of the tones permits the user to know how many times the complete loop has passed head 22 so that he can control accurately the duration of time during which head 22 is cleaned.

It will be understood that while the invention has been described hereinabove by way of illustrative embodiments of two types of cartridges, the invention is not so limited. Of course, the present invention may be adapted to use any magnetic tape cartridge configuration. Furthermore, the invention is equally applicable to tape systems having any number of tracks including, but not limited to, the four-track and eight-track systems currently available commercially.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A device for cleaning components of a player for reproducing cassette-enclosed pre-recorded magnetic tape, said player including a rotating drive capstan, comprising:

a cassette adapted for insertion into said player, said cassette having an opening for receiving the playback head of said player;

an abrasive coated tape loop disposed within said cassette, said loop passing said opening whereby said coated tape abrasively cleans said head when driven past said head by said player; and brake means for inhibiting motion of said tape loop whereby said tape loop abrasively cleans said rotating capstan.

2. The device defined in claim 1 wherein said brake means comprises:

a stationary member extending substantially between the top and bottom of said cassette; and a manually depressable button extending through the side of said cassette opposite said member, said tape loop passing between said button and said member whereby depression of said button causes said button and said member to grip said tape therebetween.

3. The device defined in claim 2 further comprising: compression means for maintaining said driven tape in contact with said head.

4. The device defined in claim 3 wherein said player includes an idler wheel driven by said capstan and said tape, said device further comprising:

brush means positioned within said casette for peripheral contact with said idler wheel for cleaning thereof.

5. The device defined in claim 4 wherein said tape loop includes a magnetic recording portion, and wherein a tone pattern is pre-recorded on said tape loop portion.

6. A cleaner cartridge for cleaning a tape player of the type accepting a pre-recorded tape cartridge, said cleaner cartridge comprising:

a case dimensionally conforming to said tape cartridge, said case having openings along its forward edge;

a loop of abrasive coated tape disposed within said case;

guide means comprising a plurality of transverse members extending substantially between the top and bottom of said case for guiding said tape within said case along a path defined by said members, said path passing said openings; and brake means comprising a manually movable rod extending through the rear end of said case opposite one of said transverse members whereby insertion of said rod will frictionally engage said coated tape between said rod and said one transverse member.

7. A device for cleaning components of a conventional magnetic tape player, comprising, in combination:

a case insertable into the tape player and having openings to receive the capstan and the playback head thereof;

a continuous loop of abrasive coated tape disposed within said case;

means within said case for guiding said coated tape around a path passing said openings whereby said tape will be driven past said playback head by said capstan when said case is inserted in said player;

compression means secured to said case for maintaining said tape in contact with said head; and brake means mounted on said case for selectively inhibiting motion of said tape.

8. The combination defined in claim 7 wherein said case further includes:

an opening adapted for insertion therethrough of the idler wheel of said tape player, said inserted idler wheel pressing said tape against said capstan, said combination further comprising;

brush means comprising a cloth pad spring mounted on said case interiorly thereof to contact the periphery of said inserted idler wheel.

References Cited

UNITED STATES PATENTS

| | | | |
|---|---|---|---|
| 3,069,815 | 12/1962 | Valentine | 51—398 |
| 2,992,447 | 7/1961 | Hicks | 15—210 |

ROBERT B. HULL, *Primary Examiner.*

F. J. D'AMBROSIO, *Assistant Examiner.*

U.S. Cl. X.R.

179—100.22